United States Patent
Lin et al.

(10) Patent No.: US 11,006,399 B2
(45) Date of Patent: May 11, 2021

(54) DATA TRANSMISSION METHOD, APPARATUS, COMPUTER DEVICE AND STORAGE MEDIUM

(71) Applicant: GUANGDONG OPPO MOBILE TELECOMMUNICATIONS CORP., LTD., Guangdong (CN)

(72) Inventors: Yanan Lin, Dongguan (CN); Wenhong Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/886,529

(22) Filed: May 28, 2020

(65) Prior Publication Data
US 2020/0296717 A1    Sep. 17, 2020

Related U.S. Application Data

(63) Continuation of application No. PCT/CN2018/076256, filed on Feb. 11, 2018.

(51) Int. Cl.
H04W 72/04 (2009.01)

(52) U.S. Cl.
CPC .............. H04W 72/0413 (2013.01)

(58) Field of Classification Search
CPC . H04W 72/0413; H04W 72/12; H04W 74/08; H04L 25/02
See application file for complete search history.

(56) References Cited

U.S. PATENT DOCUMENTS

| | | | |
|---|---|---|---|
| 9,420,570 B2 | 8/2016 | Noh | |
| 9,839,012 B2 | 12/2017 | Gao | |
| 2012/0113866 A1* | 5/2012 | Tenny | H04W 24/10 370/254 |
| 2013/0176957 A1 | 7/2013 | Gao | |
| 2013/0229998 A1 | 9/2013 | Noh | |
| 2016/0323875 A1 | 11/2016 | Noh et al. | |
| 2019/0029046 A1* | 1/2019 | Li | H04L 1/0003 |
| 2019/0223205 A1* | 7/2019 | Papasakellariou | H04L 5/00 |

FOREIGN PATENT DOCUMENTS

| | | |
|---|---|---|
| CN | 101932116 A | 12/2010 |
| CN | 102104972 A | 6/2011 |
| WO | 2015109544 A1 | 7/2015 |

OTHER PUBLICATIONS

International Search Report in the international application No. PCT/CN2018/076256, dated Nov. 1, 2018.
English translation of the Written Opinion of the International Search Authority in the international application No. PCT/CN2018/076256, dated Nov. 1, 2018.
Samsung, "Offline on CA", 3GPP TSG-RAN WG1 AH1801 R1-1801163, Vancouver, Canada, Jan. 22-26, 2018.

\* cited by examiner

*Primary Examiner* — Wei Zhao
(74) *Attorney, Agent, or Firm* — Perkins Coie LLP

(57) ABSTRACT

A data transmission method and apparatus, a computer device and a storage medium are provided. The method includes that: a terminal device selects, from at least two physical uplink shared channels (PUSCHs), a PUSCH satisfying a preset condition; and the terminal device multiplexes first uplink control information (UCI) into the selected PUSCH for transmission. The solution of the disclosure can realize the reasonable selection of a PUSCH, etc.

18 Claims, 5 Drawing Sheets

---

A terminal selects, from at least two PUSCHs, a PUSCH satisfying a preset condition — 101

The terminal multiplexes first UCI into the selected PUSCH for transmission — 102

DATA TRANSMISSION METHOD, APPARATUS, COMPUTER DEVICE AND STORAGE MEDIUM

CROSS REFERENCE TO RELATED APPLICATION

The application is a continuation of PCT Application No. PCT/CN2018/076256 filed on Feb. 11, 2018, the contents of which are incorporated herein by reference in its entirety.

BACKGROUND

A $5^{th}$ generation (5G) new radio (NR) system typically does not support simultaneous transmission of a physical uplink control channel (PUCCH) and a physical uplink shared channel (PUSCH). When a PUCCH and a PUSCH have a same start symbol and a same time-domain length, uplink control information (UCI) may be multiplexed into the PUSCH for transmission. However, other PUSCHs can also be employed to carry UCI. As for how to select a proper PUSCH to carry UCI, no effective solution has been proposed yet.

SUMMARY

The disclosure relates to a wireless network technology, and more particularly, to a data transmission method and apparatus, a computer device and a storage medium.

According to the first aspect of the present disclosure, a method for data transmission may include that:

a terminal device determines a first PUSCH among at least two PUSCHs, the first PUSCH being a PUSCH with a first start symbol position among the at least two PUSCHs; and the terminal device multiplexes first UCI into the first PUSCH for transmission.

According to the second aspect of the present disclosure, an apparatus for data transmission may include:

a processor, and a memory storing instructions executable by the processor;

wherein the processor is configured to:

determine a first physical uplink shared channel (PUSCH) among at least two PUSCHs, the first PUSCH being a PUSCH with a first start symbol position among the at least two PUSCHs; and multiplex first uplink control information (UCI) into the first PUSCH for transmission.

According to the third aspect of the present disclosure, a non-transitory computer readable medium is provided, which has program codes stored thereon for execution by a processor in a communication device to implement operations of:

determining a first PUSCH among at least two PUSCHs, the first PUSCH being a PUSCH with a first start symbol position among the at least two PUSCHs; and multiplexing first uplink control information (UCI) into the first PUSCH for transmission.

DETAILED DESCRIPTION

In order to make the technical solutions clearer, the solutions with reference to the accompanying drawings and implementations are described below.

It is apparent that the described implementations are part of the implementations of the disclosure, not all of the implementations. All other implementations obtained by those skilled in the art based on the implementations in the disclosure without creative work shall fall within the scope of protection of the disclosure.

Figure 1:
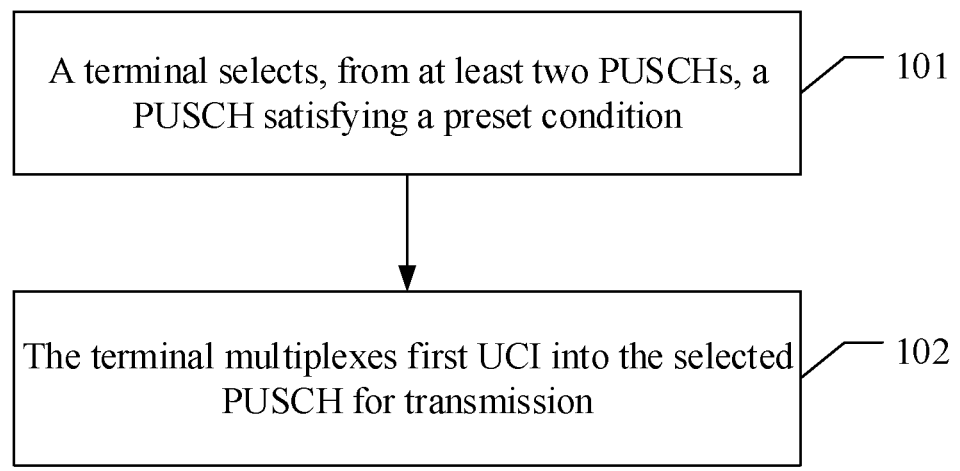
FIG. 1 is a flowchart of a data transmission method according to an implementation.

FIG. 1 is a flowchart of a data transmission method according to an implementation. As shown in FIG. 1, the method includes the operations as below.

In operation 101, a terminal device selects, from at least two PUSCHs, a PUSCH satisfying a preset condition.

In operation 102, the terminal device multiplexes first UCI into the selected PUSCH for transmission.

PUSCHs that overlap with a PUCCH to be sent in terms of time may serve as selection objects, that is, the PUSCHs at least partially overlap with the PUCCH to be sent in terms of time.

The PUCCH may be configured to carry UCI. Information contained in UCI is usually information related to a present status of a terminal device, such as whether the terminal device needs to request uplink resources presently, downlink quality detected by the terminal device presently, etc.

In addition, the UCI may be transmitted on both a PUCCH and a PUSCH. In the present implementation, after PUSCHs are determined, a PUSCH satisfying a preset condition may be selected from the PUSCHs. There are usually multiple PUSCHs, that is, more than one.

The terminal device may select a PUSCH with the highest priority from PUSCHs according to one or any combination of the following priority orders:

a PUSCH with the same start symbol and time domain length as that of a PUCCH to be sent (hereinafter referred to as a PUCCH) has higher priority than a PUSCH with a start symbol position not prior to a start symbol position of the PUCCH, wherein not prior to means later than or equal to;

a PUSCH with the same start symbol and time domain length as that of the PUCCH has higher priority than a PUSCH with a start symbol position prior to a start symbol position of the PUCCH by not greater than A symbols, A being a positive integer, wherein the specific value of A may be determined according to actual needs;

a PUSCH with a start symbol position not prior to a start symbol position of the PUCCH has higher priority than a PUSCH with a start symbol position prior to the start symbol position of the PUCCH by not greater than A symbols;

a PUSCH with a first start symbol position among PUSCHs with start symbol positions not prior to a start symbol position of the PUCCH has the highest priority;

a PUSCH with a last start symbol position among PUSCHs with start symbol positions prior to a start symbol position of the PUCCH by not greater than A symbols has the highest priority;

a grant-based PUSCH has higher priority than a grant-free PUSCH; and a slot based PUSCH has higher priority than a non-slot based PUSCH.

The slot based PUSCH is defined as a PUSCH mapping type A in the standard, and the non-slot based PUSCH is defined as type B.

In addition, the terminal device may make selection sequentially according to preset priority of different modes in a descending order when selecting the PUSCH with the highest priority from at least two PUSCHs according to one or any combination of the priority orders, wherein a latter mode is to select a PUSCH from at least one PUSCH selected by an adjacent previous mode.

After the PUSCH is selected in the above modes, if the number of the selected PUSCH is greater than one, a PUSCH with the smallest carrier number may be further selected, and the PUSCH with the smallest carrier number is used as a finally needed PUSCH.

The mode of selecting a PUSCH from the at least two PUSCHs may include that:

a PUSCH with the same start symbol and time domain length as that of the PUCCH is selected from the at least two PUSCHs;

a PUSCH with a start symbol position not prior to a start symbol position of the PUCCH is selected from the at least two PUSCHs;

a PUSCH with a start symbol position prior to a start symbol position of the PUCCH by not greater than A symbols is selected from the at least two PUSCHs, A being a positive integer;

a slot based PUSCH is selected from the at least two PUSCHs; and a grant-based PUSCH is selected from the at least two PUSCHs, etc.

In practical applications, only one of the modes may be used for selection, or a combination of at least two modes may be used for selection. Preferably, the latter mode may be used.

In addition, when a combination of at least two of the modes is used for selection, selection may be performed sequentially in various modes according to a descending order of different modes of priority. The latter mode is to select a PUSCH from at least one PUSCH selected by the adjacent previous mode. When the number of the selected PUSCH is greater than one, a PUSCH with the smallest carrier number may be further selected.

Figure 2:
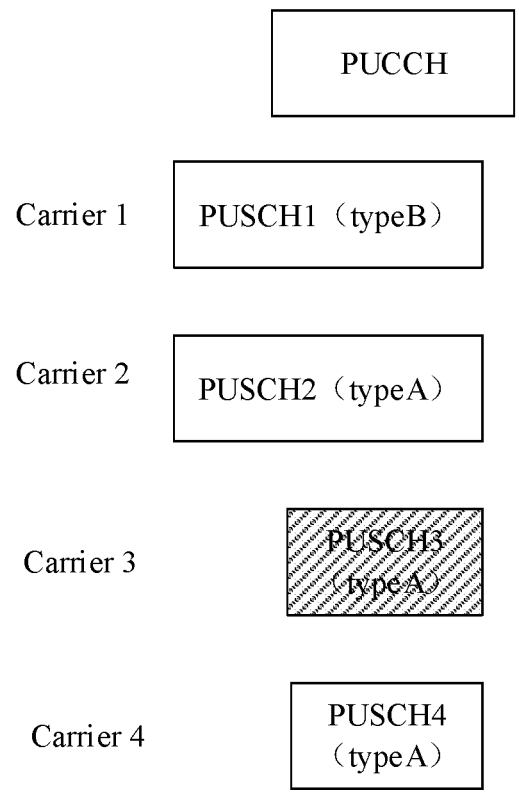
FIG. 2 is a schematic diagram of PUSCHs according to an implementation.

It is assumed that there are four PUSCHs, which are PUSCH1, PUSCH2, PUSCH3, and PUSCH4, as shown in FIG. 2. FIG. 2 is a schematic diagram of PUSCHs according to an implementation.

For each PUSCH shown in FIG. 2, it is assumed that the mode of selecting a slot based PUSCH from the PUSCHs and the mode of selecting a PUSCH with a start symbol position not prior to a start symbol position of the PUCCH from the PUSCHs are combined to select a PUSCH, and the priority of the mode of selecting a slot based PUSCH from the PUSCHs is higher than the priority of the mode of selecting a PUSCH with a start symbol position not prior to a start symbol position of the PUCCH from the PUSCHs.

Slot based PUSCHs may be first selected from PUSCH1, PUSCH2, PUSCH3, and PUSCH4 according to the mode under which a slot based PUSCH is selected from the PUSCHs. As shown in FIG. 2, PUSCH2, PUSCH3, and PUSCH4 of type A are selected. Since PUSCH1 is type B, PUSCH1 will not be selected.

PUSCHs with start symbol positions not prior to a start symbol position of the PUCCH may be further selected from PUSCH 2, PUSCH 3 and PUSCH 4 according to the mode of selecting a PUSCH with a start symbol position not prior to a start symbol position of the PUCCH from the PUSCHs. As shown in FIG. 2, PUSCH 3 and PUSCH 4 are selected. Since the start symbol position of PUSCH2 is prior to the start symbol position of the PUCCH, PUSCH 2 will not be selected.

After the two selections, two PUSCHs can be obtained, namely PUSCH 3 and PUSCH 4, the number of which is greater than one. Therefore, further selection is needed, that is, the PUSCH with the smallest carrier number is selected, which is PUSCH 3, as shown in FIG. 2, and then PUSCH 3 is used as a finally needed PUSCH.

After the final PUSCH is selected, the terminal device may multiplex the first UCI into the finally selected PUSCH for transmission. How to perform transmission can be implemented by the conventional art.

In addition, the terminal device may further determine a PUCCH to transmit second UCI according to configuration information. The first UCI may be the same as the second UCI, or, the second UCI may be compressed to obtain the first UCI.

The above is the processing mode on a terminal device side. The processing mode on a base station side may be similar to that on the terminal device side. For example, the base station may select, from at least two PUSCHs, a PUSCH satisfying a preset condition, and then may receive first UCI from the selected PUSCH. The mode of the base station selecting the PUSCH may be the same as the mode of the terminal device, and details are omitted herein.

The above is the description of the method implementation. The apparatus implementation below further describes the solutions of the disclosure.

Figure 3:
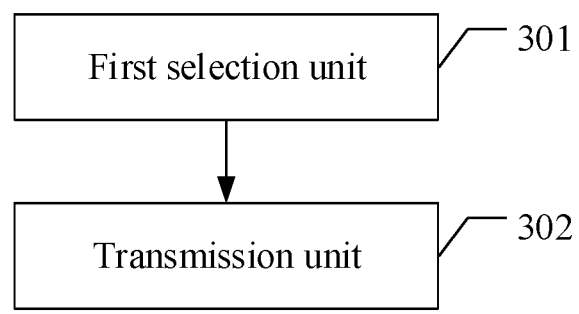
FIG. 3 is a schematic diagram of a composition structure of a data transmission apparatus according to an implementation.

FIG. 3 is a schematic diagram of a composition structure of a data transmission apparatus according to an implementation. As shown in FIG. 3, the apparatus includes a first selection unit 301 and a transmission unit 302.

The first selection unit 301 is configured to select, from at least two PUSCHs, a PUSCH satisfying a preset condition.

The transmission unit 302 is configured to multiplex first UCI into the selected PUSCH for transmission.

The transmission unit 302 may further be configured to determine a PUCCH to transmit second UCI according to configuration information. The first UCI may be the same as the second UCI, or, the second UCI may be compressed to obtain the first UCI.

The PUSCHs serving as selection objects may include: a PUSCH that overlaps with a PUCCH to be sent in terms of time.

There may be usually multiple PUSCHs as selection objects, and the first selection unit 301 may select a PUSCH satisfying a preset condition.

For example, the first selection unit 301 may be configured to select a PUSCH with the highest priority from at least two PUSCHs according to one or any combination of the following priority orders:

a PUSCH with the same start symbol and time domain length as that of a PUCCH to be sent has higher priority than a PUSCH with a start symbol position not prior to a start symbol position of the PUCCH;

a PUSCH with the same start symbol and time domain length as that of the PUCCH has higher priority than a PUSCH with a start symbol position prior to a start symbol position of the PUCCH by not greater than A symbols, A being a positive integer;

a PUSCH with a start symbol position not prior to a start symbol position of the PUCCH has higher priority than a PUSCH with a start symbol position prior to the start symbol position of the PUCCH by not greater than A symbols;

a PUSCH with a first start symbol position among PUSCHs with start symbol positions not prior to a start symbol position of the PUCCH has the highest priority;

a PUSCH with a last start symbol position among PUSCHs with start symbol positions prior to a start symbol position of the PUCCH by not greater than A symbols has the highest priority;

a grant-based PUSCH has higher priority than a grant-free PUSCH; and a slot based PUSCH has higher priority than a non-slot based PUSCH.

In addition, the first selection unit 301 may make selection sequentially according to preset priority of different modes in a descending order when selecting a PUSCH with the highest priority from at least two PUSCHs according to one or any combination of the priority orders, wherein the latter mode is to select a PUSCH from at least one PUSCH selected by the adjacent previous mode.

The number of PUSCHs selected in the above modes may be greater than one. When there are more than one selected PUSCHs, the first selection unit 301 may further select a PUSCH with the smallest carrier number and use the selected PUSCH with the smallest carrier number as a finally selected PUSCH, and the transmission unit 302 may further be configured to multiplex first UCI into the finally selected PUSCH for transmission.

Figure 4:
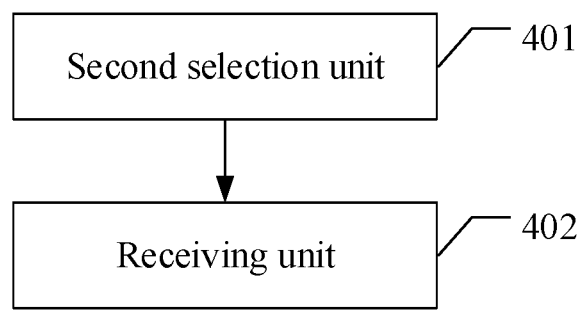
FIG. 4 is a schematic diagram of a composition structure of a data transmission apparatus according to an implementation.

FIG. 4 is a schematic diagram of a composition structure of a data transmission apparatus according to an implementation. As shown in FIG. 4, the apparatus includes a second selection unit 401 and a receiving unit 402.

The second selection unit 401 is configured to select, from at least two PUSCHs, a PUSCH satisfying a preset condition.

The receiving unit 402 is configured to receive first UCI from the selected PUSCH.

The PUSCHs serving as selection objects may include: a PUSCH that overlaps with a PUCCH to be sent in terms of time.

The second selection unit 401 may be configured to select a PUSCH with the highest priority from the PUSCHs according to one or any combination of the following priority orders:

a PUSCH with the same start symbol and time domain length as that of a PUCCH to be sent has higher priority than a PUSCH with a start symbol position not prior to a start symbol position of the PUCCH;

a PUSCH with the same start symbol and time domain length as that of the PUCCH has higher priority than a PUSCH with a start symbol position prior to a start symbol position of the PUCCH by not greater than A symbols, A being a positive integer;

a PUSCH with a start symbol position not prior to a start symbol position of the PUCCH has higher priority than a PUSCH with a start symbol position prior to the start symbol position of the PUCCH by not greater than A symbols;

a PUSCH with a first start symbol position among PUSCHs with start symbol positions not prior to a start symbol position of the PUCCH has the highest priority;

a PUSCH with a last start symbol position among PUSCHs with start symbol positions prior to a start symbol position of the PUCCH by not greater than A symbols has the highest priority;

a grant-based PUSCH has higher priority than a grant-free PUSCH; and a slot based PUSCH has higher priority than a non-slot based PUSCH.

In addition, the second selection unit 401 may be configured to make selection in various ways sequentially according to preset priority of different modes in a descending order when selecting a PUSCH with the highest priority from PUSCHs according to one or any combination of the priority orders. The latter mode is to select a PUSCH from at least one PUSCH selected by the adjacent previous mode.

The number of PUSCHs selected in the above modes may be greater than one. When there are more than one PUSCHs, the second selection unit 401 may further be configured to select a PUSCH with the smallest carrier number.

Please refer to descriptions in the foregoing method implementations for working processes of the apparatus implementations shown in FIG. 3 and FIG. 4. The details are omitted herein.

In a word, by adopting the solutions of the disclosure, reasonable PUSCH selection can be made, thereby improving DCI transmission performance, etc.

Figure 5:
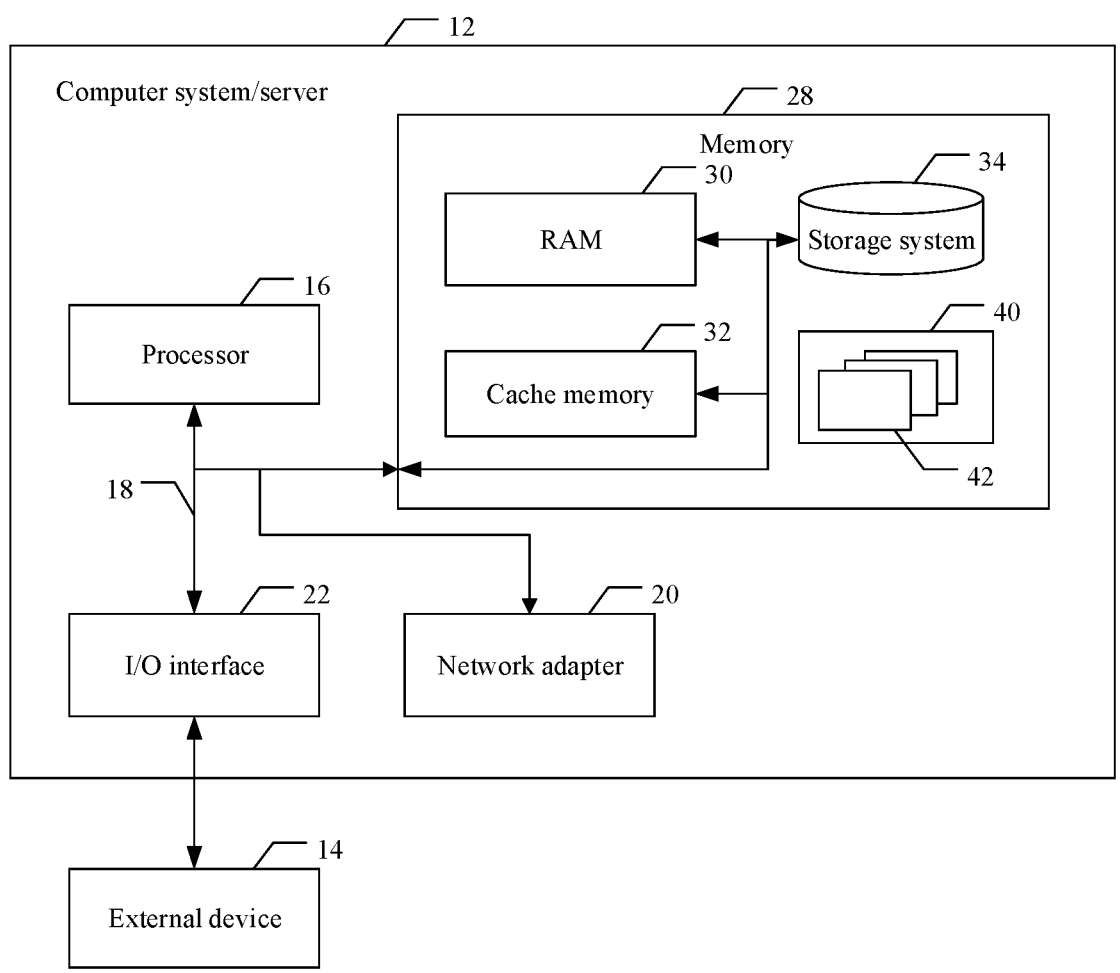
FIG. 5 shows a block diagram of a computer system/server 12 according to an implementation.

FIG. 5 shows a block diagram of a computer system/server 12 according to an implementation. The computer system/server 12 shown in FIG. 5 is merely an example, and should not impose any limitation on the function and scope of the implementation of the disclosure.

As shown in FIG. 5, the computer system/server 12 is represented by a universal computing device. The components of the computer system/server 12 may include, but are not limited to, one or more processors (processing units) 16, a memory 28, and a bus 18 connecting different system components (including the memory 28 and the processor 16).

The bus 18 may represent one or more of several types of bus structures, including a memory bus or a memory controller, a peripheral bus, a graphics acceleration port, a processor, or a local area bus with any one of a variety of bus structures. For example, these architectures include, but are not limited to, an Industry Standard Architecture (ISA) bus, a Micro Channel Architecture (MAC) bus, an enhanced ISA bus, a Video Electronics Standards Association (VESA) local area bus, and a Peripheral Component Interconnect (PCI) bus.

The computer system/server 12 typically includes a variety of computer system readable media. The media may be any available media that can be accessed by the computer system/server 12, including volatile and non-volatile media, removable and non-removable media.

The memory 28 may include a computer system readable media in the form of a volatile memory, such as a Random Access Memory (RAM) 30 and/or a cache memory 32. The computer system/server 12 may further include other removable/non-removable, volatile/non-volatile computer system storage media. For example, the storage system 34 may be configured to read and write non-removable and non-volatile magnetic media (not shown in FIG. 5 and commonly referred to as a "hard disk drive"). Although not shown in FIG. 5, a disk drive for reading and writing a removable non-volatile disk (for example, a "floppy disk") and an optical drive for reading and writing a removable non-volatile optical disk (for example, CD-ROM, DVD-ROM or other optical media). In these cases, each drive may be connected to the bus 18 through one or more data medium interfaces. The memory 28 may include at least one program product with a set (for example, at least one) of program modules configured to perform the functions of each implementation of the disclosure.

A program/utility tool 40 with a set (at least one) of program modules 42 may be stored in, for example, the memory 28. Such program modules 42 may include, but are not limited to, an operating system, one or more application programs, other program modules and program data. Each or some combination of these examples may include realization of a network environment. The program module 42 generally implements functions and/or methods in the implementations described in the disclosure.

The computer system/server 12 may also communicate with one or more external devices 14 (such as a keyboard, a pointing device or a display 24), and may also communicate with one or more devices that enable users to interact with the computer system/server 12, and/or communicate with any device (such as a network card or a modem) that enables the computer system/server 12 to communicate with one or more other computing devices. This communication may be performed through an Input/output (I/O) interface 22. Moreover, the computer system/server 12 may also communicate with one or more networks (such as a Local Area Network (LAN), a Wide Area Network (WAN), and/or a public network, such as the Internet) through a network adapter 20. As shown in FIG. 5, the network adapter 20 may communicate with other modules of the computer system/server 12 through the bus 18. It should be understood that although not shown in the figure, other hardware and/or software modules may be used in conjunction with the computer system/server 12 including, but not limited to, micro-codes, device drives, redundant processing units, external disk drive arrays, RAID systems, tape drives, and data backup storage systems.

The processor 16 may implement various functional applications and data processing by running a program stored in the memory 28, for example, implementing the method shown in FIG. 1.

The disclosure also describes a computer-readable storage medium, which has a computer program stored thereon. The program may be executed by a processor to implement the method as shown in FIG. 1.

Any combination of one or more computer-readable media may be used. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination thereof. A more specific example (non-exhaustive list) of the computer-readable storage medium may include: an electric connection portion with one or more wires, a portable computer disk, a hard disk, a RAM, a Read-Only Memory (ROM), an Erasable Programmable ROM (EPROM) (or flash memory), an optical fiber, a portable CD-ROM, an optical storage device, a magnetic storage device, or any suitable combination of the foregoing. In the disclosure, the computer-readable storage medium may be any tangible medium that contains or stores a program. The program may be used by or in combination with an instruction execution system, apparatus, or device.

The computer-readable signal medium may include a data signal that is propagated in a baseband or as part of a carrier, carrying computer-readable program codes. Such propagated data signals may have a variety of types including, but not limited to, electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device.

Program codes included in the computer-readable medium may be transmitted by any suitable medium, including but not limited to wireless, wired, optical cable, RF, etc., or any suitable combination of the foregoing.

Computer program codes for performing the operations of the disclosure may be written in one or more programming languages, or combinations thereof, including object-oriented programming languages such as Java, Smalltalk, C++, and also including conventional procedural programming languages such as "C" or similar programming languages. The program codes may be executed entirely on a user computer, partially on a user computer, as an independent software package, partially on a user computer and partially on a remote computer, or entirely on a remote computer or server. In the case of involving the remote computer, the remote computer may be connected to the user computer through any type of network, including a LAN or WAN, or may be connected to an external computer (such as connected through the Internet using an Internet service provider).

In some implementations provided by the disclosure, it is to be understood that the described apparatus and method may be implemented in other manners. For example, the device implementation described above is only schematic, and for example, division of the units is only logic function division, and other division manners may be adopted during practical implementation.

The units described as separate parts may or may not be physically separated. The parts displayed as units may or may not be physical units, namely, may be located in the same place, or may be distributed to multiple network units. Part or all of the units may be selected to achieve the purpose of the solutions of the implementations according to a practical requirement.

In addition, each functional unit in each implementation of the disclosure may be integrated into a processing unit, each unit may also physically exist independently, and two or more than two units may also be integrated into a unit. The integrated unit may be implemented in a hardware form or in the form of hardware and software functional unit.

The integrated unit realized in the form of software functional unit may be stored in the computer-readable storage medium. The software functional unit may be stored in a storage medium, including a plurality of instructions enabling a computer device (which may be a personal computer, a server, a network device or the like) or a processor to execute part of the steps of the method in each implementation of the disclosure. The foregoing storage medium may include: various media capable of storing program codes such as a U disk, a mobile hard disk, a ROM, a RAM, a magnetic disk or an optical disk.

The above description is only the preferred implementations of the disclosure and is not intended to limit the disclosure. Any modifications, equivalent replacements, improvements and the like made within the spirit and principle of the disclosure should fall within the scope of protection of the disclosure.

The invention claimed is:
1. A method for data transmission, comprising:
determining, by a terminal device, a first physical uplink shared channel (PUSCH) among at least two PUSCHs, wherein the first PUSCH is a PUSCH with a first start symbol position among the at least two PUSCHs; and
multiplexing, by the terminal device, first uplink control information (UCI) into the first PUSCH for transmission,
wherein the first PUSCH is determined at least partially based on one or more of the following:
the first start symbol position and time domain length of the first PUSCH;
a number of symbols between the first start symbol position first PUSCH and a start symbol position of a physical uplink control channel (PUCCH);
whether the first PUSCH being a grant-based PUSCH or a grant-free PUSCH; and
whether the first PUSCH being a slot-based PUSCH.

2. The method according to claim 1, further comprising:
determining, by the terminal device, a second PUSCH among the at least two PUSCHs, wherein the second PUSCH is a grant-based PUSCH.

3. The method according to claim 2, wherein determining, by the terminal device, the first PUSCH among the at least two PUSCHs comprises:
determining the first PUSCH according to the second PUSCH.

4. The method according to claim 1, further comprising:
determining, by the terminal device, a physical uplink control channel (PUCCH) to transmit second UCI according to configuration information,
wherein the first UCI is as same as the second UCI, or, the second UCI is compressed to obtain the first UCI.

5. The method according to claim 1, wherein the at least two PUSCHs comprise a PUSCH that overlaps with a PUCCH to be sent in terms of time.

6. The method according to claim 1, wherein a start symbol position of the first PUSCH is not prior to a start symbol position of a physical uplink control channel (PUCCH).

7. An apparatus for data transmission, comprising:
a processor, and
a memory storing instructions executable by the processor;
wherein the processor is configured to:
determine a first physical uplink shared channel (PUSCH) among at least two PUSCHs, wherein the first PUSCH is a PUSCH with a first start symbol position among the at least two PUSCHs; and
multiplex first uplink control information (UCI) into the first PUSCH for transmission,
wherein the first PUSCH is determined at least partially based on one or more of the following:
the first start symbol position and time domain length of the first PUSCH;
a number of symbols between the first start symbol position first PUSCH and a start symbol position of a physical uplink control channel (PUCCH);
whether the first PUSCH being a grant-based PUSCH or a grant-free PUSCH; and
whether the first PUSCH being a slot-based PUSCH.

8. The apparatus according to claim 7, wherein the processor is further configured to:
determine a second PUSCH among the at least two PUSCHs, wherein the second PUSCH is a grant-based PUSCH.

9. The apparatus according to claim 8, wherein the processor is further configured to determine the first PUSCH according to the second PUSCH.

10. The apparatus according to claim 7, wherein the processor is further configured to:
determine a physical uplink control channel (PUCCH) to transmit second UCI according to configuration information,
wherein the first UCI is as same as the second UCI, or, the second UCI is compressed to obtain the first UCI.

11. The apparatus according to claim 7, wherein the at least two PUSCHs comprise a PUSCH that overlaps with a PUCCH to be sent in terms of time.

12. The apparatus according to claim 7, wherein a start symbol position of the first PUSCH is not prior to a start symbol position of a physical uplink control channel (PUCCH).

13. A non-transitory computer readable medium, having program codes stored thereon for execution by a processor in a communication device to implement operations of:
determining a first physical uplink shared channel (PUSCH) among at least two PUSCHs, wherein the first PUSCH is a PUSCH with a first start symbol position among the at least two PUSCHs; and
multiplexing first uplink control information (UCI) into the first PUSCH for transmission,
wherein the first PUSCH is determined at least partially based on one or more of the following:
the first start symbol position and time domain length of the first PUSCH;
a number of symbols between the first start symbol position first PUSCH and a start symbol position of a physical uplink control channel (PUCCH);
whether the first PUSCH being a grant-based PUSCH or a grant-free PUSCH; and
whether the first PUSCH being a slot-based PUSCH.

14. The non-transitory computer readable medium according to claim 13, wherein the processor is configured to further run the program codes to determine a second PUSCH among the at least two PUSCHs, wherein the second PUSCH is a grant-based PUSCH.

15. The non-transitory computer readable medium according to claim 14, wherein, when determining the first PUSCH among the at least two PUSCHs, the processor is configured to run the program codes to determine the first PUSCH according to the second PUSCH.

16. The non-transitory computer readable medium according to claim 13, wherein the processor is configured to further run the program codes to determine a physical uplink control channel (PUCCH) to transmit second UCI according to configuration information,
wherein the first UCI is as same as the second UCI, or, the second UCI is compressed to obtain the first UCI.

17. The non-transitory computer readable medium according to claim 13, wherein the at least two PUSCHs comprise a PUSCH that overlaps with a PUCCH to be sent in terms of time.

18. The non-transitory computer readable medium according to claim 13, wherein a start symbol position of the first PUSCH is not prior to a start symbol position of a physical uplink control channel (PUCCH).

* * * * *